United States Patent [19]
Scheuring et al.

[11] Patent Number: 5,593,227
[45] Date of Patent: Jan. 14, 1997

[54] TWIN-SHAFT SCREW-TYPE EXTRUDING MACHINE HAVING MIXING ELEMENTS WITH WINGS

[75] Inventors: Bernhard Scheuring, Affalterbach; Edgar Schlipf, Stuttgart, both of Germany

[73] Assignee: Werner & Pfleiderer, GmbH, Germany

[21] Appl. No.: 506,667

[22] Filed: Jul. 25, 1995

[30] Foreign Application Priority Data

Jul. 26, 1994 [DE] Germany .................... 44 26 441.0

[51] Int. Cl.⁶ ........................................ B29B 7/48
[52] U.S. Cl. ................................. 366/82; 366/85
[58] Field of Search ................ 366/79–85, 88–90, 366/319, 321; 425/204, 208, 209

[56] References Cited

U.S. PATENT DOCUMENTS

| | | |
|---|---|---|
| 3,195,868 | 7/1965 | Loomans et al. |
| 4,744,669 | 5/1988 | Kowalczyk et al. ........... 366/85 X |
| 4,752,135 | 6/1988 | Loomans. |
| 5,000,900 | 3/1991 | Baumgartner ................ 366/81 X |

*Primary Examiner*—Charles E. Cooley
*Attorney, Agent, or Firm*—Laff, Whitesel, Conte & Saret, Ltd.

[57] ABSTRACT

A twin-shaft screw-type extruding machine comprises a casing, shafts driven to rotate in the same direction of rotation and mixing elements facing each other and associated in pairs, which are disposed non-rotatably on the shafts. Each mixing element is a disk connected with a shaft. Mixing wings are provided at equal angular distances on the fronts, facing each other, of the disk and in the vicinity of the latter's respective circumference. A mixing wing of a mixing element and a mixing wing of the associated mixing element interengage and rotate past each other, while leaving a gap.

14 Claims, 3 Drawing Sheets

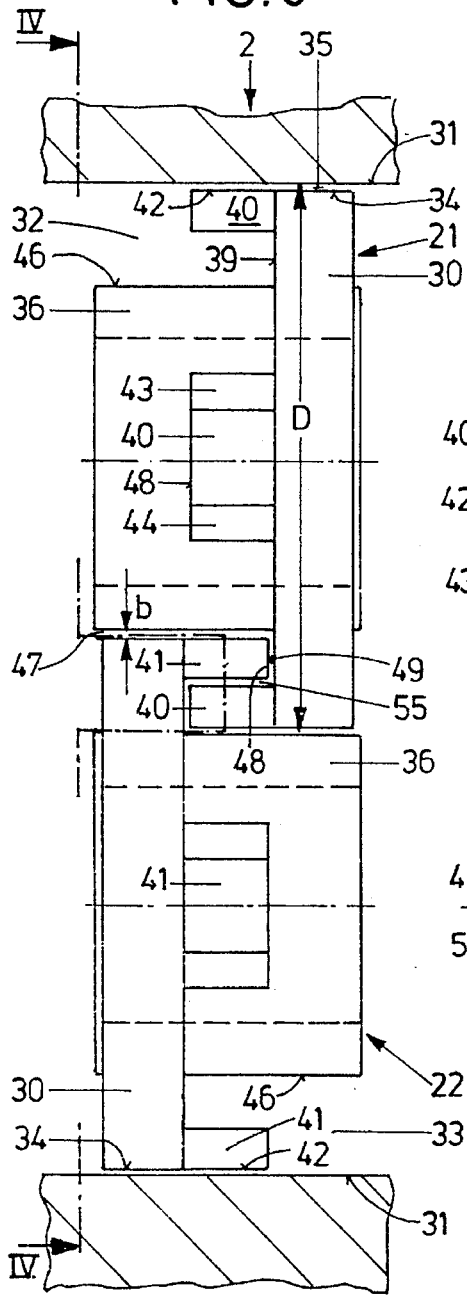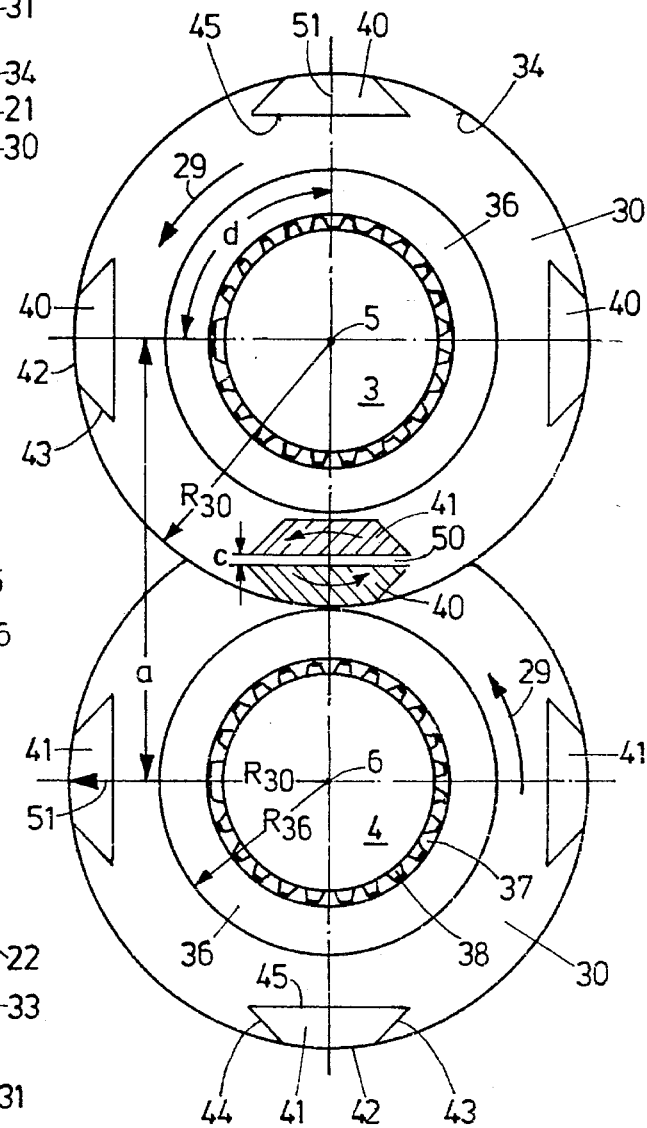

TWIN-SHAFT SCREW-TYPE EXTRUDING MACHINE HAVING MIXING ELEMENTS WITH WINGS

BACKGROUND OF THE INVENTION

1. Field of the Invention

The invention relates to a twin-schaft screw-type extruding machine, in particular a twin-shaft extruder, comprising a casing, two intersecting casing bores parallel to each other, a feed opening at one end of the casing and a discharge opening at the other end of the casing, two shafts disposed in the casing bores and driven to rotate in the same direction of rotation, screw elements disposed non-rotatably on the shafts, and mixing elements facing each other and associated in pairs, which are disposed non-rotatably on the shafts.

2. Background Art

Various mixing elements of different arrangements are used for the admixture of fillers and reinforcing agents into twin-shaft extruders. Owing to their dispersing and distributive mixing effect, these mixing elements lead to a homogeneous admixture of the fillers and reinforcing agents into a plastics matrix. When reinforcing fillers such as glass fibers are added to a plastics matrix, the length of the individual fibers should be reduced as little as possible for the final product to exhibit as good as possible mechanical properties. This is encountered by the demand for thermal and mechanical homogeneity of the product. The known mixing elements have not succeeded in attaining the effect of little damages to the fibers and sufficient homogeneity, the dispersing portion of these known mixing elements being too high.

A continuous mixer is known from U.S. Pat. No. 3,195,868 to have two parallel, intersecting casing bores in a casing. Each casing bore is provided with a shaft to be driven in the same direction of rotation. Mixing elements assigned to each other by twos are disposed on the shafts and are provided with mixing wings interengaging during rotation. These mixing wings are attached to paddle-type disks in the form of kneading blocks. They allow the material to pass though the housing unhampered in the conveying direction.

A similar design of kneading blocks is known from U.S. Pat. No. 4,752,135.

SUMMARY OF THE INVENTION

It is an object of the invention to embody a screw-type extruding machine of the generic type such that, in particular for fibrous additions and reinforcing fillers, a homogeneous distribution is attained in the plastics matrix, accompanied by lowest possible damages to the fibers and by sufficient humidification.

According to the invention, this object is attained in that each mixing element is a disk connected with a shaft, in that mixing wings are provided at equal angular distances on the fronts, facing each other, of the disk and in the vicinity of the latter's respective circumference, a mixing wing of a mixing element and a mixing wing of the associated mixing element interengaging and rotating past each other, while leaving open a gap.

The invention ensures that the material flowing through the screw-type extruding machine is forcibly guided through a mixing chamber formed between the mixing elements, where it is again forcibly exposed to the mixing effect of the wings. Depending on the design, the dispersing or distributive portion of the mixing wings can be higher or lower, a high distributive portion and a low dispersing portion being desired fundamentally to keep as low as possible the damages to the reinforcing fillers, which consist for instance of fibers, in particular of glass fibers.

Further features, advantages and details of the invention will become apparent from the ensuing description of an example of embodiment, taken in conjunction with the drawing.

BRIEF DESCRIPTION OF THE DRAWING

FIG. 3 is a plan view of a pair of mixing elements corresponding to the illustration of FIG. 1 and 2, FIG. 4 is a sectional view of the mixing elements according to the section line IV—IV of FIG. 3.

DESCRIPTION OF THE PREFERRED EMBODIMENT

Figure 1:
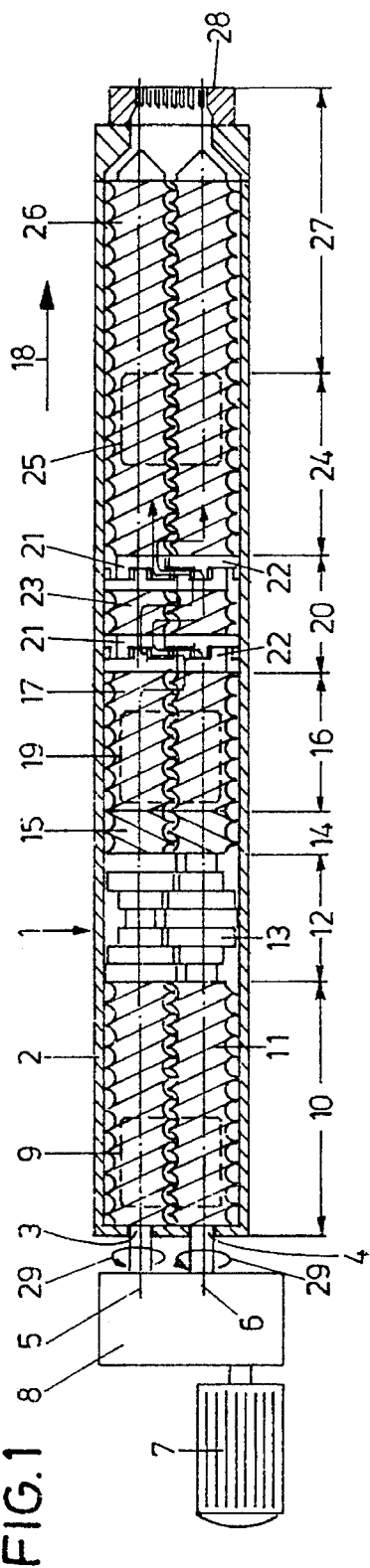
FIG. 1 is a plan view of a twin-shaft extruder with a housing in an illustration partially broken open.

FIG. 1 shows a twin-shaft extruder 1 with its casing 2 in an illustration broken open. The twin-shaft extruder 1 comprises two shafts 3, 4, the axes 5,6 of which extend parallel. A motor 7 drives the shafts 3, 4 by way of a branching gearing 8. Adjoining the gearing 8, a feed hopper 9 (only roughly outlined) is provided in the casing 2 for a polymer to be melted in the extruder 1. Subsequent to and below this hopper 9, a feed zone 10 is formed, in which conveying screw elements 11 are disposed on the shafts 3, 4. Subsequent to this, kneading blocks 13 are installed on the shafts 3,4 in a melting zone 12. This is followed by an accumulation zone 14, in which the shafts 3, 4 are provided with return conveying screw elements 15, the threads of which having a direction reverse to that of the conveying screw elements 11. The accumulation zone 14 is followed by an adding zone 16, in which again conveying screw elements 17 are mounted on the shafts 3, 4, feeding in the conveying direction 18 of the extruder 1. Directly behind the return conveying screw elements 15, an adding hopper 19 (roughly outlined) opens into the casing 2. It serves for the addition for instance of glass fibers into the melting.

The melting zone 16 is followed by a mixing zone 20, in which the shafts 3, 4 are provided with mixing elements 21, 22, two of which interengaging at a time; details of the mixing elements 21, 22 will be described below. Two pairs of interengaging mixing elements 21, 22 are provided, comprising between them comparatively short conveying screw elements 23. This mixing zone 20 is followed by a vented zone 24, in which a vent 25 (roughly outlined) is formed in the housing 2. In this vented zone 24, conveying screw elements 26 are mounted on the shafts 3, 4, conveying the polymer, to which fillers and reinforcing agents have been added, in the conveying direction 18 towards a discharge zone 27 with a so-called apertured strip as a discharge member 28.

Figure 2:
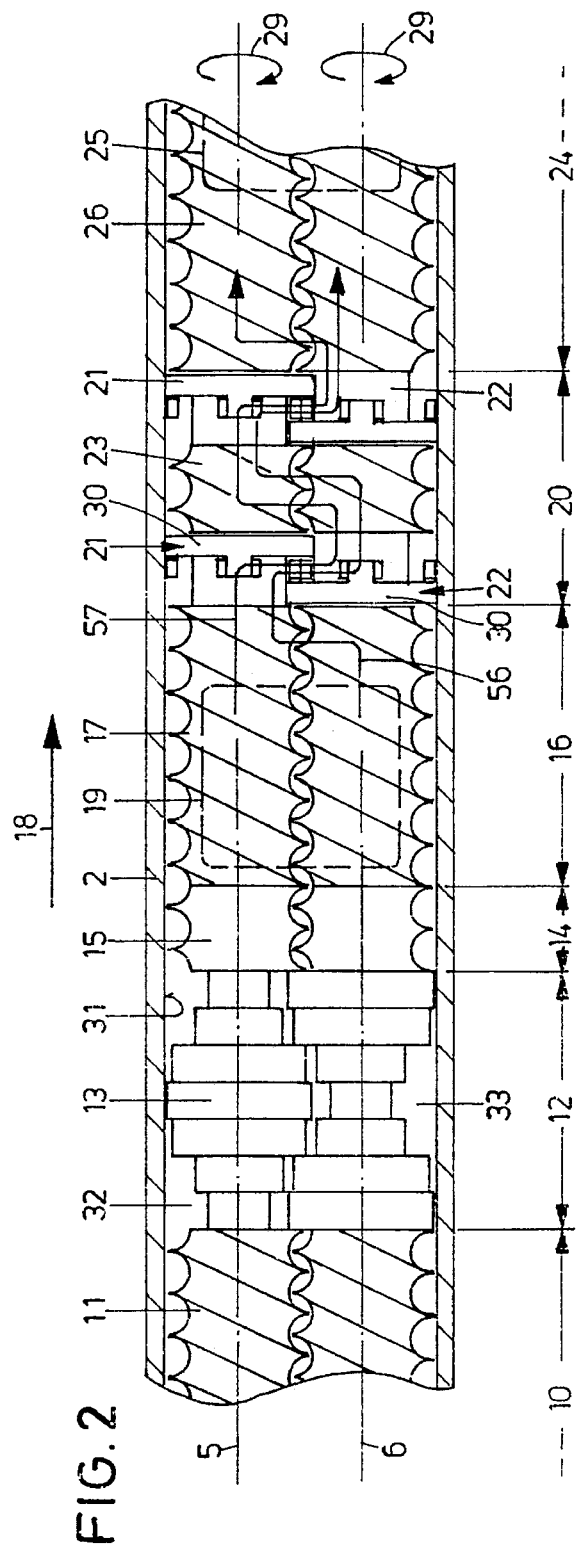
FIG. 2 is a partial sectional view of FIG. 1 on an enlarged scale.

FIG. 2 shows a section of the extruder 1 on an enlarged scale from the end of the feed zone 10 as far as to the vent 25. As can be seen from this, too, the screw elements 11, 15, 17, 26 mesh, i.e. they are driven in the same direction, namely the direction of rotation 29.

The interengaging mixing elements 21, 22 associated in pairs are structured identically. They have a closed ring disk 30 extending as far as to the associated inside wall 31, cylindrical in the shape of a segment of a circle, of the casing bore 32 or 33, which houses the respective shaft 3 or 4, a gap 35 of some tenths of a millimeter to few millimeters of width remaining between the cylindrical circumferential face 34 of the ring disk 30 and the inside wall 31 of the respective casing bore 32 or 33.

A ring cylinder 36 is mounted on, or formed in one piece with, the respective closed ring disk 30, the ring disk 30 and the ring cylinder 36 being disposed coaxially to the respective axis 5 or 6. As seen in FIG. 4, an inner toothing 37 is formed on the inside face of the respective ring cylinder 36 and correspondingly on the inside face of the ring disk 30 and corresponds to an outer toothing 38 on the shaft 3 or 4 so that the mixing elements 21 and 22 can be fixed non-rotatably on the shafts 3 and 4. This is also the way how the other elements specified above are mounted non-rotatably on the shafts 3 and 4.

On the side on which the respective ring cylinder 36 projects over the ring disk 30, mixing wings 40 and 41 are fixed to the front 39, adjacent to the ring cylinder 36, of the ring disk 30; the mixing wings 40 and 41 have an outer flank 42 which is flush with the circumferential face 34 of the respective ring disk 30, i.e. it corresponds to the latter. They further comprise a flank 43 leading in the direction of rotation 29 and a flank 44 lagging in the direction of rotation 29 and an inner flank 45 facing towards the ring cylinder 36. The mixing wings 40 of the mixing element 21 extend counter to the conveying direction 18, whereas the mixing wings 41 of the associated mixing element 22 extend in the conveying direction 18.

The two axes 5, 6 of the shafts 3, 4 have a distance a, which owing to the two casing bores 32, 33 passing into each other, is less than the diameter D of the casing bores 32, 33, which are of identical diameter. The ring disks 30 have a radius $R_{30}$, which is less than D/2 because of the gap 35. The ring cylinders 36 have a radius $R_{36}$, a gap 47 of the width b remaining between the circumferential face 34 of the ring disk 30 of one mixing element 21 or 22 and the circumferential face 46 of the ring cylinder 36 of the other associated mixing element 22 or 21. The relation $a=R_{30}+R_{36}+b$ applies. The width b of the gap 47 can be equal to the width of the gap 35. When two mixing elements 21, 22 are fitted into each other corresponding to the illustration of FIGS. 1 to 3, then the fronts 48 of the mixing wings 40 and 41, respectively, extend as far as to the facing front 39 of the ring disk 30 of the other mixing wing 41 and 40, respectively, leaving open a small gap 49.

The inner flanks 45 of two mixing wings 40 and 41 of the two mixing elements 21, 22 rotate past each other by twos, the shafts 3, 4 having the same direction of rotation 29. They are plane, forming secants referred to the cylindrical circumferential faces 34 of the ring disks 30. In the case of the total overlapping of two associated mixing wings 40, 41 shown in FIGS. 3 and 4, the inner flanks 45 of the two mixing wings 40, 41 extend parallel to each other, a gap 50 being left between them, the width c of which amounting to some tenths of a millimeter to few millimeters depending on the dimension of $R_{30}$ and $R_{36}$. When the two mixing wings 40 and 41 rotate towards each other or apart, then the gap 50 is wider; it has its smallest dimension c, when the two inner flanks 45 are parallel to each other, i.e. when the two mixing wings 40, 41 entirely overlap, their planes of symmetry 51 passing into each other and intersecting both axes 5, 6.

All the mixing wings 40 and 41, respectively, are identical, namely mirror-symmetrical referred to a plane of symmetry 51, which is placed through the axis 5 and 6, respectively, and lies in the center of the outer flank 42 and the inner flank 45. The mixing wings 40 and 41 are disposed at identical angular distances d of their planes of symmetry 51, so that the angular distance d is for instance 90° in the case of four mixing wings 40 and 41.

Figure 5:
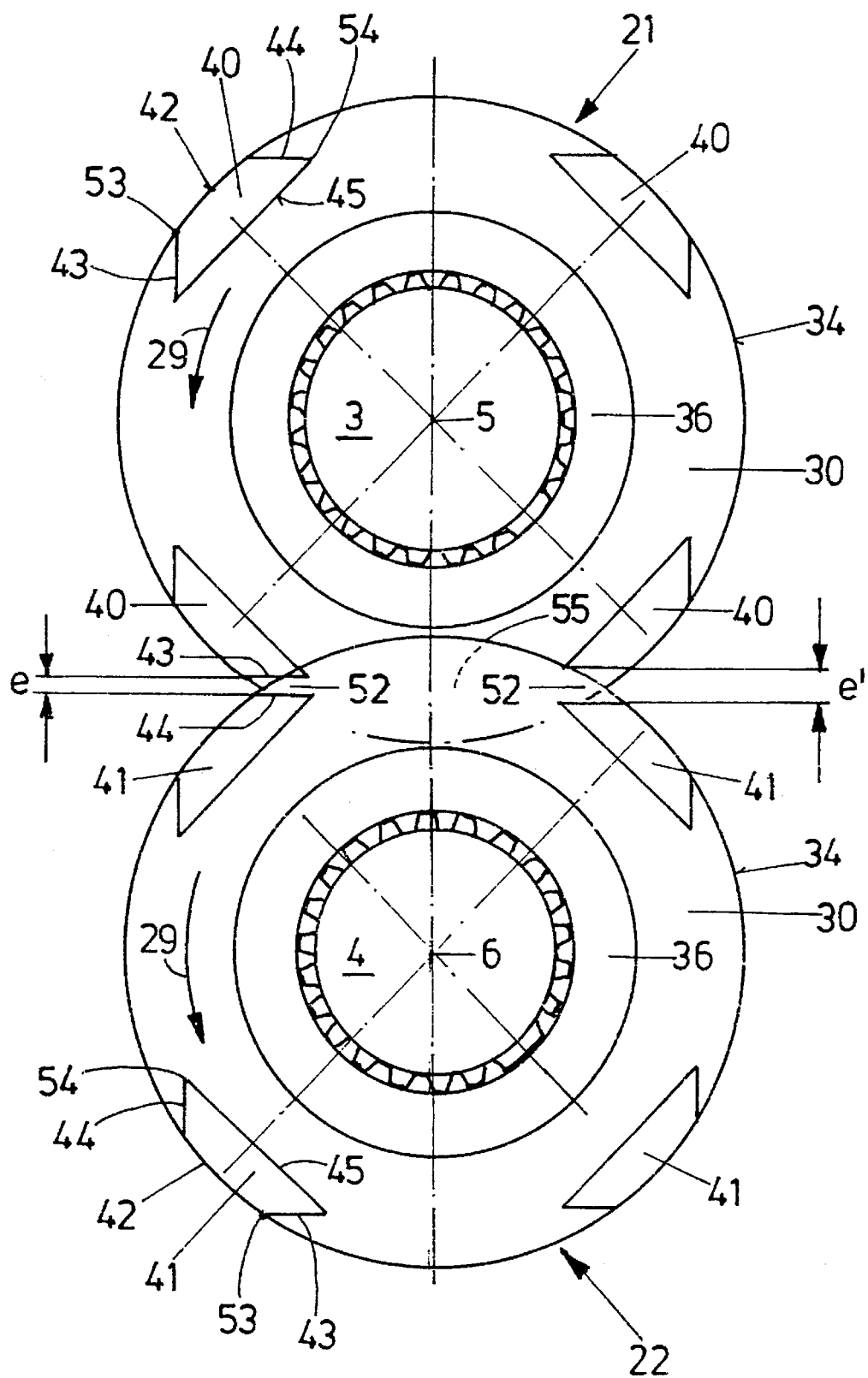
FIG. 5 is an illustration, according to FIG. 4, of the mixing elements in a position rotated by an angle of rotation.

The leading flanks 43 and the lagging flanks 44 are structured such that they do not collide, but leave a gap 52 when rotating past each other. The leading flank 43 of a mixing wing 40 of a mixing element 21 overlaps a lagging flank 44 of a mixing wing 41 of the mixing element 22 and vice versa, when—as seen in FIG. 5—the mixing elements 21, 22 are rotated by an angle d/2 as compared to the position of complete overlapping of the inner flanks 45 shown in FIGS. 3 and 4. In this case, the leading flank 43 of a mixing wing 40 opposes a lagging flank 44 of a mixing wing 41 and vice versa. Preferably, the leading flanks 43 and the lagging flanks 44 are plane same as the inner flanks 45. For collisions of the mixing wings 40 and 41 to be avoided when the leading and the lagging flanks 43, 44 of the mixing wings 40, 41 rotate past the lagging and the leading flanks 43, 44 of the mixing wings 41, 40, this gap 52 must be sufficiently wide. This width changes of course upon rotation of a leading flank 43 past a lagging flank 44. The minimum width e of the gap 52 is shown in FIG. 5 on the left. This minimum width e results from the fact that the edge of cut 53 between a leading flank 43 and the outer flank 42 of a mixing wing 40 does not collide with the edge of cut 54 between a lagging flank 44 and the inner flank 45 of a mixing wing 41 and vice versa. A gap 52 of greater width e' is shown on the right in FIG. 5, it applying to the difference e'−e that it can be some tenths of a millimeter to few millimeters, this depending on the dimension of $R_{30}$ and $R_{36}$ and on the number of mixing wings 40, 41 distributed along the circumference, i.e. on the angular distance d.

For the sake of completeness attention is drawn to the fact that the leading and lagging flanks 43 and 44, respectively, can be formed as a segment-of-a- cylinder face in such a manner that the width e could approach zero theoretically.

The greatest possible cross-section of a mixing wing 40 and 41, respectively, is determined in that upon rotation past each other of two interengaging mixing wings according to the illustration of FIGS. 3 and 4, the width c of the gap 50 approaches zero in the position of overlap of two mixing wings 40, 41, and in that the gap 52 approaches e upon rotation past each other of a leading flank 43 and a lagging flank 44. Basically, any cross-sections of mixing wings can be formed from this greatest cross-section. However, the above-mentioned form of a mixing wing is preferred, since the outer flanks 42 are stripped by the inside wall 31 of the respective casing bore 32 and 33 and by the circumferential face 46 of the opposite ring cylinder 36, and since the inner flanks 45 of two mixing wings 40, 41 strip each other, and the leading flanks 43 of the mixing wings 40 and 41 are stripped by the lagging flanks 44 of the mixing wings 41 and 40.

Since each ring disk 30 of a mixing element 41, 42 closes the associated casing bore 32 and 33, respectively, the material to be mixed, i.e., a molten polymer and fillers and reinforcing agents, are forcibly guided through a mixing chamber 55, which is formed between the two ring disks 30 of the mixing elements 21, 22 facing each other. As seen in FIGS. 1 to 3 and in particular in FIG. 3, the material conveyed in den conveying direction 18 in the casing bore 33 accumulates in front of the ring disk 30 of the mixing element 22 and is deflected according to the arrow 56 of flow direction into the other casing bore 32, where it can flow towards the ring disk 30, displaced axially in the conveying direction 18, of the mixing element 21. The material arriving in the casing bore 32 flows according to the arrow 57 of flow direction as far as before the ring disk 30 of the mixing element 21, where it is accumulated and correspondingly deflected radially into the mixing chamber 55 formed between the two ring disks 30. In this mixing chamber 55, the material is forcibly exposed to a distributive, i.e. distributing, mixing process by the interengaging mixing wings 40, 41. When the gaps 50 and 52 are sufficiently dimensioned, there is only minor shearing action, i.e. only a low distributing effect. The degree of destruction of glass fiber filaments and similar small fibers is correspondingly lower in this mixing process.

What is claimed is:

1. A twin-shaft screw-type extruding machine, comprising a casing (2) having a first end and a second end, a first casing bore (32) and a second casing bore (33) intersecting and parallel to said first casing bore (32) and each of said first and said second casing bore (32, 33) having an inside wall (31), a feed opening (9) at said first end of the casing (2) and a discharge opening (28) at said second end of the casing (2), a first shaft (3) disposed in said first casing bore (32) and a second shaft (4) disposed in said second casing bore (33) said first and said second shaft (3, 4) driven to rotate in the same direction of rotation (29) and having axes (5, 6), screw elements (11, 15, 17, 26) disposed non-rotatably on said first and said second shaft (3, 4), and a first mixing element (21) comprising a first disk (30) which is non-rotatably connected to said first shaft (3) and a second mixing element (22) comprising a second disk (30), non-rotatably connected with said second shaft (4), wherein said first disk (30) has a front (39) and said second disk (30) has a front (39) which fronts (39) face each other, and wherein each of said first and said second disk (30) have a circumference (34), wherein mixing wings (40, 41) are provided at equal angular distances (d) on said fronts (39), facing each other, of said first and said second disk (30) and in the vicinity of the circumference (34) of each of said first and second disk (30), and wherein one of said mixing wings (40) of said first mixing element (21) and one of said mixing wings (41) of said second mixing element (22) interengage and rotate past each other, while leaving open a first gap (50).

2. A screw-type extruding machine according to claim 1, wherein said first and second disks (30) are closed ring disks each having a cylindrical circumferential face (34), which defines a second gap (35) towards the inside wall (31) of the respective casing bore (32, 33).

3. A screw-type extruding machine according to claim 2, wherein each mixing element (21, 22) comprises a ring cylinder (36), which is contiguous to the front (39) of the disk (30), and wherein the circumferential face (34) of said ring disk (30) of said first mixing element (21) in cooperation with a circumferential face (46) of the ring cylinder (36) of said second mixing element (22) defines a gap (47).

4. A screw-type extruding machine according to claim 3, wherein between the two ring cylinders (36) and the two ring disks (30) of the two first and second mixing elements (21, 22), a mixing chamber (55) is defined, in which said first and second mixing wings (40, 41) rotate past each other while interengaging.

5. A screw-type extruding machine according to claim 2, wherein the mixing wings (40, 41) each have an outer flank (42), which defines said second gap (35) towards the inside wall (31) of the respective casing bore (32, 33).

6. A screw-type extruding machine according to claim 5, wherein the outer flank (42) of each mixing wing (40, 41) has the shape of a segment of a cylinder and is flush with the circumferential face (34) of the ring disk (30).

7. A screw-type extruding machine according to claim 1, wherein each mixing element (21, 22) comprises a ring cylinder (36), which is contiguous to the front (39) of the disk (30).

8. A screw-type extruding machine according to claim 1, wherein the mixing wings (40, 41) each have an inner flank (45), and wherein the inner flanks (45) of said first and second mixing wings (40, 41) rotate past each other, forming said first gap (50).

9. A screw-type extruding machine according to claim 8, wherein the inner flank (45) of each mixing wing (40, 41) is plane.

10. A screw-type extruding machine according to claim 1, wherein the mixing wings (40, 41) have a leading flank (43) and a lagging flank (44).

11. A screw-type extruding machine according to claim 10, wherein the leading flank (43) of one of said mixing wings (40, 41) of one of said mixing elements (21, 22) rotates past a lagging flank (44) of one of said mixing wings (41, 40) of said first and second mixing element (22, 21), while forming only one third gap (52).

12. A screw-type extruding machine according to claim 10, wherein the leading flank (43) of each mixing wing (40, 41) is plane.

13. A screw-type extruding machine according to claim 10, wherein the lagging flank (44) of each mixing wing (40, 41) is plane.

14. A screw-type extruding machine according to claim 1, wherein the mixing wings (40, 41) are mirror-symmetrical referred to a plane of symmetry (51) placed through the axes (5, 6) of the shafts (3, 4).

* * * * *